United States Patent
Wu

(10) Patent No.: US 10,415,538 B2
(45) Date of Patent: Sep. 17, 2019

(54) NEGATIVE-PRESSURE WAVE GENERATOR

(71) Applicant: Ting-Ching Wu, New Taipei (TW)

(72) Inventor: Ting-Ching Wu, New Taipei (TW)

(*) Notice: Subject to any disclaimer, the term of this patent is extended or adjusted under 35 U.S.C. 154(b) by 371 days.

(21) Appl. No.: 15/374,978

(22) Filed: Dec. 9, 2016

(65) Prior Publication Data

US 2018/0163692 A1 Jun. 14, 2018

(51) Int. Cl.
| | |
|---|---|
| *F03B 13/22* | (2006.01) |
| *F03B 15/00* | (2006.01) |
| *F04F 5/46* | (2006.01) |
| *F04F 5/10* | (2006.01) |
| *B63B 35/44* | (2006.01) |

(52) U.S. Cl.
CPC .............. *F03B 13/22* (2013.01); *F03B 15/00* (2013.01); *F04F 5/10* (2013.01); *F04F 5/46* (2013.01); *F04F 5/466* (2013.01); *B63B 2035/4466* (2013.01); *F05B 2240/133* (2013.01); *F05B 2240/40* (2013.01); *F05B 2270/18* (2013.01); *Y02E 10/32* (2013.01); *Y02E 10/38* (2013.01)

(58) Field of Classification Search
CPC .. B63B 2035/4466; F03B 13/22; F03B 15/00; F04F 5/10; F04F 5/46; F04F 5/466; F05B 2240/133; F05B 2240/40; F05B 2270/18; Y02E 10/32; Y02E 10/38
See application file for complete search history.

(56) References Cited

U.S. PATENT DOCUMENTS

| | | | | |
|---|---|---|---|---|
| 4,447,740 A | * | 5/1984 | Heck | F03B 13/22 290/53 |
| 6,140,712 A | * | 10/2000 | Fredriksson | F03B 13/1855 290/53 |
| 6,692,513 B2 | * | 2/2004 | Streeter | A61F 2/01 606/200 |

(Continued)

FOREIGN PATENT DOCUMENTS

| | | |
|---|---|---|
| EP | 2 584 189 A2 | 4/2013 |
| WO | 2008/015047 A1 | 2/2008 |

(Continued)

OTHER PUBLICATIONS

Extended European Search Report of the EPC application.

*Primary Examiner* — Jesse S Bogue
(74) *Attorney, Agent, or Firm* — Sinorica, LLC

(57) ABSTRACT

A negative-pressure wave generator has a flow-driven assembly and a power-generating assembly disposed in the sea. The flow-driven assembly has multiple Venturi tubes connected to a power generating culvert of the power-generating assembly. The power generating culvert has a generator assembly. When sea water passes, the Venturi tubes generate negative pressure to make the water flow into the flow-driven assembly from the power generating culvert. A large pressure difference is formed between outside sea water out of a turbine disposed in a front end and a chamber disposed in a rear end, and the pressure difference drives the turbine to drive the generator assembly. The transferring efficiency is high and the water in all the flow channels is in low pressure to prevent the water pipes from burst and leakage. The negative-pressure wave generator is simple in structure and solid, lowering the maintenance cost.

14 Claims, 16 Drawing Sheets

(56) References Cited

U.S. PATENT DOCUMENTS

| | | | |
|---|---|---|---|
| 8,925,313 B2* | 1/2015 | Moffat | F03B 13/22 60/497 |
| 9,222,456 B2* | 12/2015 | Han | F03B 13/145 |
| 9,500,176 B2* | 11/2016 | Moffat | F03B 13/22 |
| 2010/0283248 A1* | 11/2010 | Moffat | F03B 13/22 290/52 |
| 2012/0248778 A1 | 10/2012 | Yen | |
| 2015/0048619 A1 | 2/2015 | Lin et al. | |
| 2018/0058420 A1* | 3/2018 | Moffat | F03B 11/02 |

FOREIGN PATENT DOCUMENTS

| | | |
|---|---|---|
| WO | 2010/110799 A1 | 9/2010 |
| WO | 2011/043849 A2 | 4/2011 |
| WO | 2011/114155 A2 | 9/2011 |

* cited by examiner

NEGATIVE-PRESSURE WAVE GENERATOR

BACKGROUND OF THE INVENTION

1. Field of the Invention

The present invention relates to a generator related to wave power, especially to a negative-pressure wave generator.

2. Description of the Prior Arts

In the field of generators powered by waves, many techniques have been sophisticatedly developed. Those techniques also have been put into commercial application or practically installed in the sea. Said generator techniques include various types, such as hydraulic, Oscillating Water Column (OWC), overtopping, and so on.

The hydraulic generator technique adopts a hydraulic system, which transfers the wave energy into rotation mechanism energy, and then the rotation mechanism energy is used for power generation. The transferring efficiency may reach the expectation in the early stage. But the hydraulic system includes dedicated actuating mechanism, such as hydraulic cylinders and pistons. The continuous and non-stop wave movements may cause wear to the mechanism. In addition, since the hydraulic value in the tube often remains in a high-pressure range, the components also may have leakage problems. Therefore, after working for a period of time, the transferring efficiency gradually drops, and the cost of maintenance is increased.

The Oscillating Water Column generates power by the wave oscillation, which makes the water stream in a tube oscillating and pushing the air flow. Advantages include that this type is simple in structure, rarely has a breakdown, and the main equipments do not directly contact the seawater, thereby facilitating ease in maintenance. However, since the air is lower than the sea water in density, the transferring efficiency is lowered.

The overtopping generator generates power by storing the wave that is over a ramp in a tank floating on the sea. The water level of the tank must be higher than the sea level by at least three meters, thereby generating power by the difference in water level. This type of generator rarely breaks down, and is easy in maintenance. However, the overtopping generator needs wave higher than three meters to reach the transferring efficiency, and there are very few sea areas that can regularly have such high waves.

In addition, another type of generator generates power by the difference between the peaks and valleys. Water flows from high to low, forming a one-way flow to drive the generator. This type is simple in structure and has lowered maintenance cost. However, power can only be generated by half of the height of the wave, that is, the transferring efficiency is low.

To overcome the shortcomings, the present invention provides a negative-pressure wave generator to mitigate or obviate the aforementioned problems.

SUMMARY OF THE INVENTION

The main objective of the present invention is to provide a negative-pressure wave generator that makes the wave generate large negative-pressure and makes the kinetic energy of large quantity of low-pressure water pass through the generator assembly to keep generating power. The present invention is simple in structure and has lowered cost in maintenance. The negative-pressure wave generator has
  a flow-driven assembly having
    a negative pressure mechanism having
      an inlet main tube;
      at least one Venturi tube disposed vertically, each one of the at least one Venturi tube being a hollow tube, and having
        a top opening disposed in a top end of the Venturi tube;
        a bottom opening disposed in a bottom end of the Venturi tube; and
        a throat formed between the top opening and the bottom opening, and being smaller than the top opening and the bottom opening in inner diameter; and
      at least one inlet branch tube connected between and communicating with the inlet main tube and the throat of the at least one Venturi tube;
    a float having buoyancy and capable of controlling a magnitude of the buoyancy; and
    a frame connected between the negative pressure mechanism and the float; and
  a power-generating assembly having
    at least one water pipe connected to the inlet main tube;
    a power generating culvert having a casing, and the casing having
      a chamber formed inside of the casing;
      at least one through hole formed through a bottom of the casing; an end of the at least one water pipe mounted through the at least one through hole and disposed in the chamber;
      an inlet opening disposed above the casing and communicating with the chamber; and
      a flow part formed in a middle of the casing, and disposed between the inlet opening and the end of the at least one water pipe;
    a central power station platform connected to the power generating culvert, and having buoyancy and capable of controlling a magnitude of the buoyancy; and
    a generator assembly having
      a generator mounted on the central power station platform;
      a turbine disposed in the flow part of the power generating culvert; and
      a driven shaft connected between the generator and the turbine to make the turbine drive the generator.

When the flow-driven assembly and the negative pressure mechanism is moved up and down by the wave, the water flows fast when passing through the Venturi tube, thereby generating negative pressure with larger pressure difference in the throat. A water pipe communicates with the negative pressure mechanism and the power generating culvert of the power-generating assembly, such that large amount of the sea water keeps entering the power generating culvert, and keeps driving the generating assembly in the power generating culvert to generate power. Since the generating power is simply processed by sea water driving the turbine, the transferring efficiency is high.

In addition, most part of the structure does not rotate, thereby eliminating wear of the mechanism and enhancing the reliability. Furthermore, the present invention is simple in structure and is solid, so the maintenance cost is lowered.

Besides, since the water in all the flow channels are in low pressure, the equipment or the water pipes are not prone to burst, thereby eliminating the leakage.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
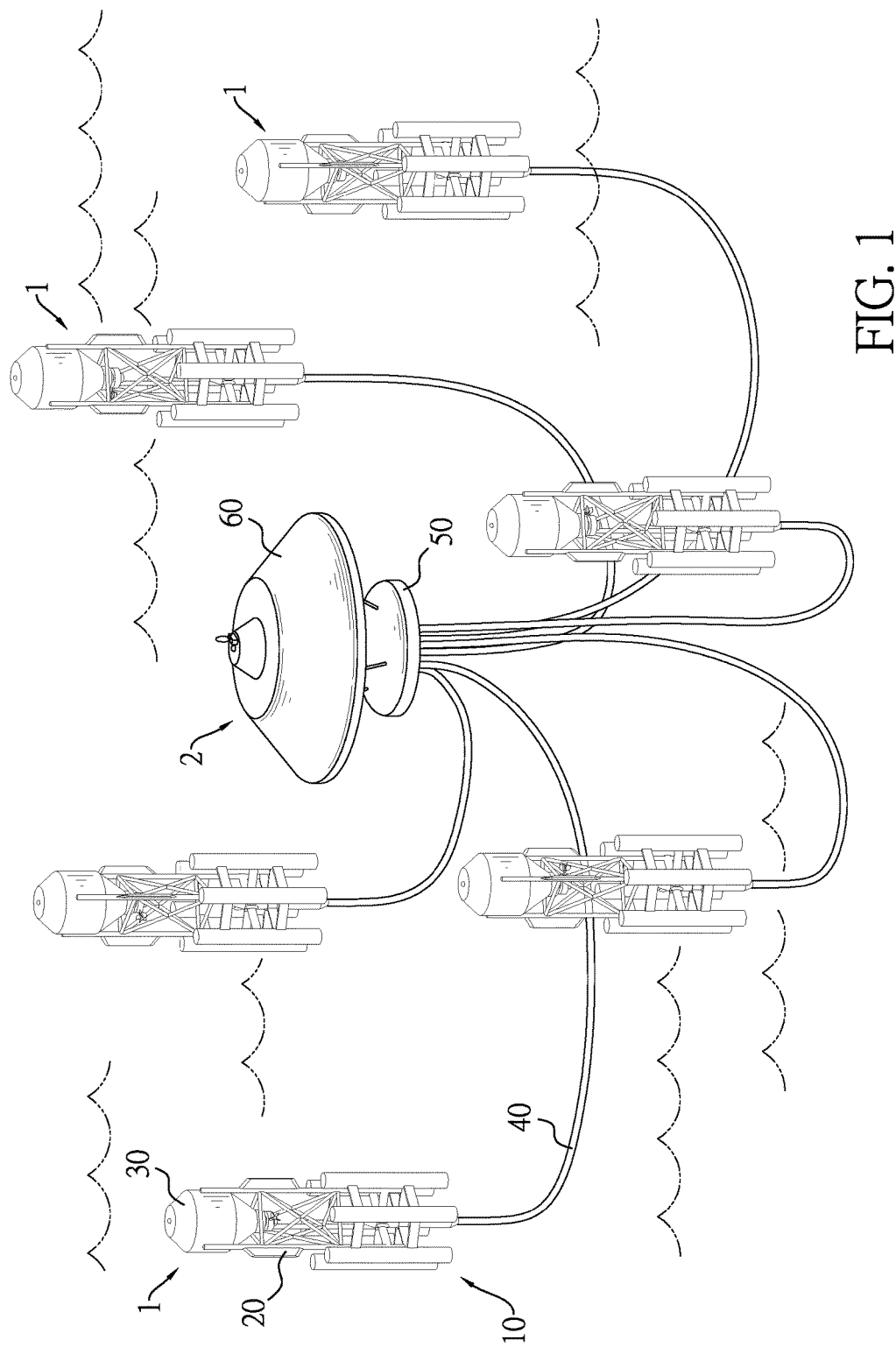
FIG. 1 is a perspective view of a negative-pressure wave generator in accordance with the present invention.

With reference to FIG. 1, a negative-pressure wave generator in accordance with the present invention comprises at least one flow-driven assembly 1 and a power-generating assembly 2. Each one of the at least one flow-driven assembly 1 is connected to the power-generating assembly 2. In a preferred embodiment as shown in the figures, the negative-pressure wave generator comprises six flow-driven assemblies 1, which are disposed around the power-generating assembly 2.

Figure 2:
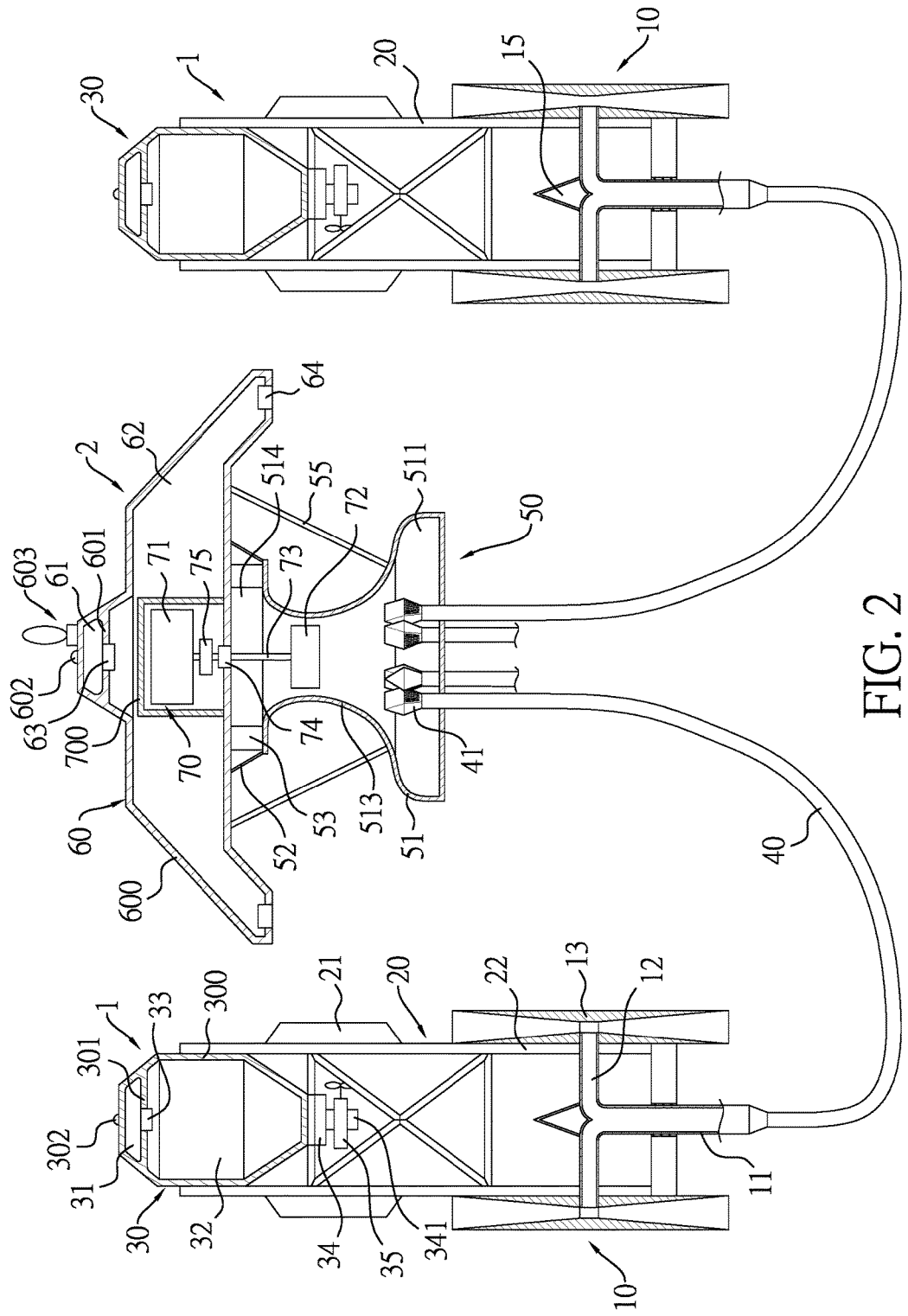
FIG. 2 is a front view in partial section of the negative-pressure wave generator in FIG. 1.
Figure 3:
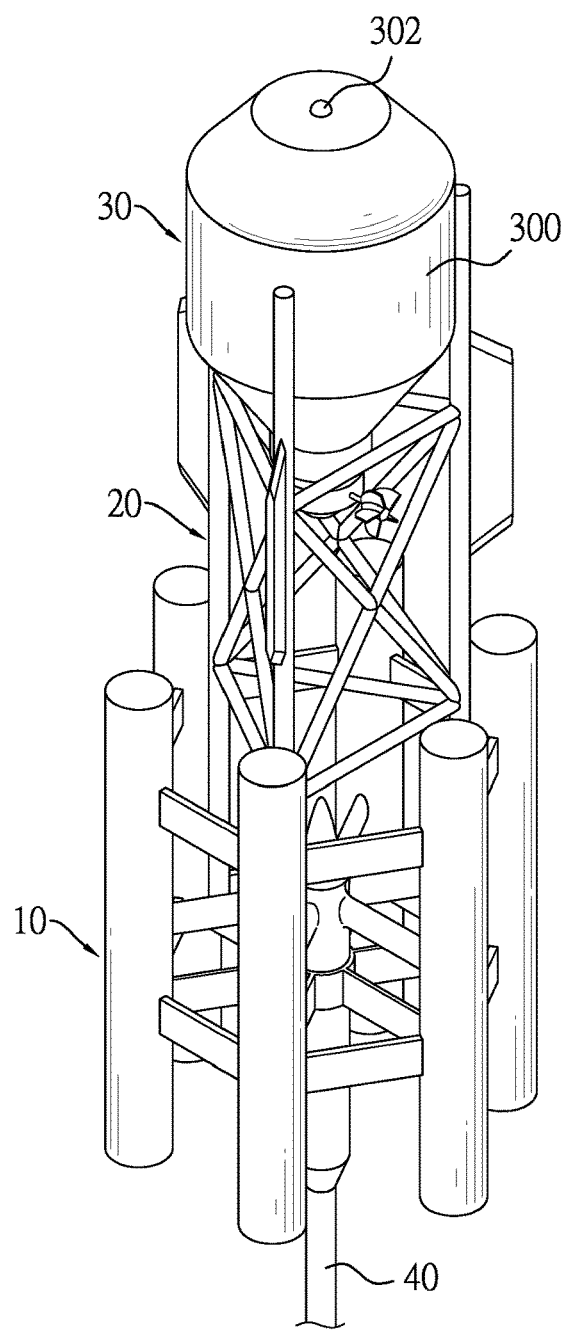
FIG. 3 is a perspective view of a flow-driven assembly of the negative-pressure wave generator in FIG. 1.
Figure 4:
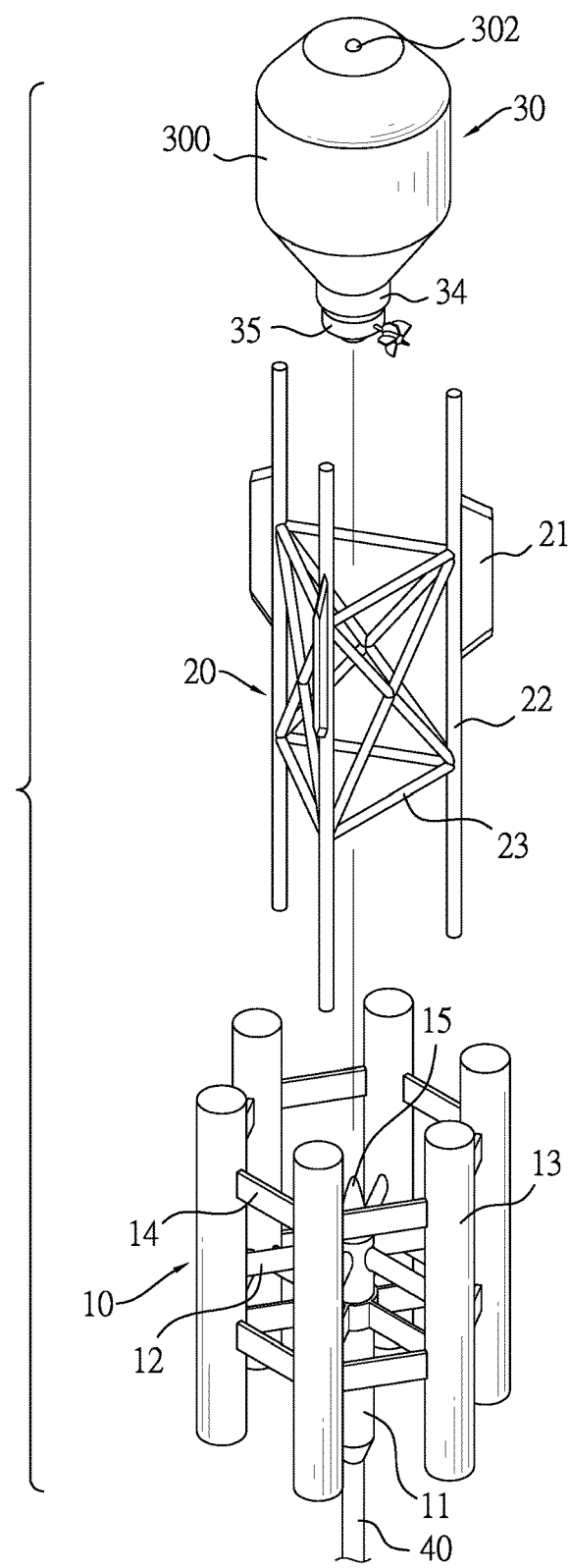
FIG. 4 is an exploded perspective view of the flow-driven assembly of the negative-pressure wave generator in FIG. 1.

With reference to FIGS. 2 to 4, the flow-driven assembly 1 has a negative pressure mechanism 10, a frame 20 and a float 30.

The negative pressure mechanism 10 has an inlet main tube 11, at least one inlet branch tube 12, and at least one Venturi tube 13. One end of the inlet branch tube 12 is connected to one end of the inlet main tube 11. The other end of the inlet branch tube 12 is connected to the corresponding Venturi tube 13. In a preferred embodiment as shown in the figures, the negative pressure mechanism 10 has multiple inlet branch tubes 12 and multiple Venturi tubes 13. The Venturi tubes 13 are disposed vertically, and are arranged apart from each other.

The inlet main tube 11 is a hollow tube for water to pass through, and the inlet main tube 11 has two end openings.

Figure 7:
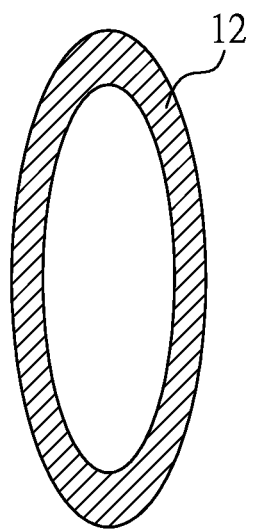
FIG. 7 is a side view in partial section of an inlet branch along line 7-7 of FIG. 5.

The inlet branch tube 12 is a hollow tube for water to pass through, and the inlet branch tube 12 has two end openings. One of the end openings of the inlet branch tube 12 is connected to one of the end openings of the inlet main tube 11. The inlet branch tube 12 and its two end openings are all oval in cross section as shown in FIG. 7. A longitudinal axis of the inlet branch tube 12 is disposed vertically.

Figure 5:
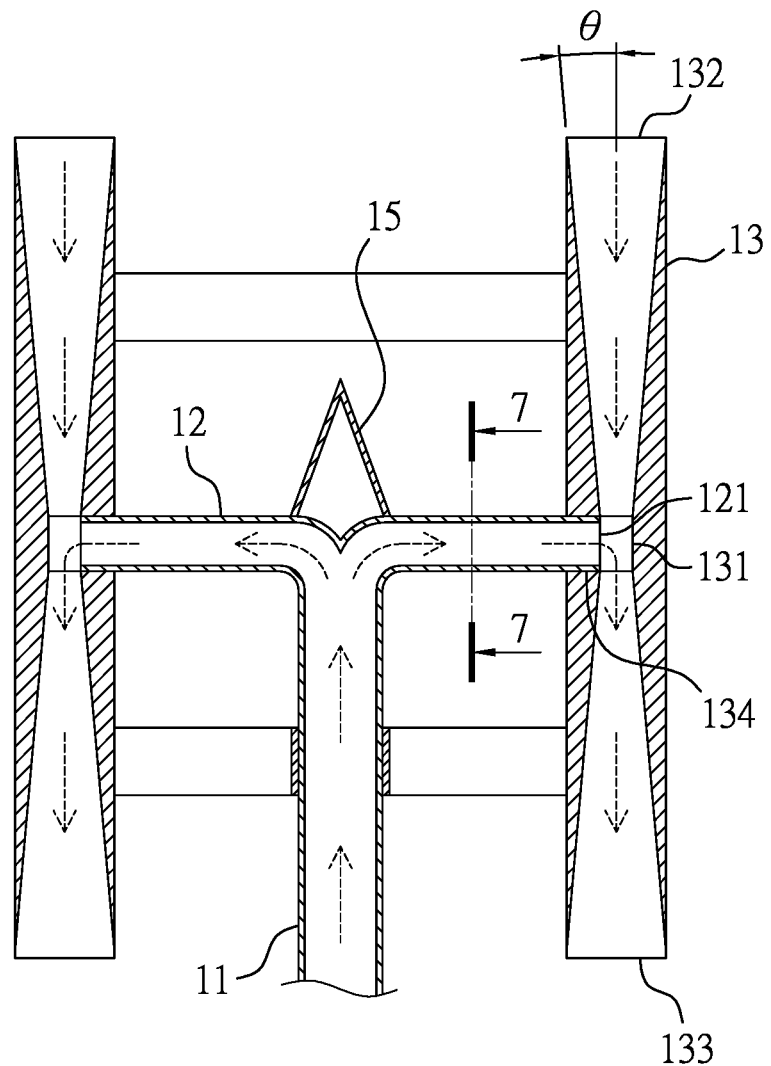
FIG. 5 is an operational front view of a negative pressure mechanism of the flow-driven assembly of the negative-pressure wave generator in FIG. 1, showing a water flow when floating upward.

With reference to FIG. 5, the Venturi tube 13 is a hollow tube for water, which is moved by the up-and-down movement of the wave, to pass through. The Venturi tube 13 has a throat 131, a top opening 132 and a bottom opening 133. The top opening 132 and the bottom opening 133 are respectively in the two ends of the Venturi tube 13. The throat 131 is formed inside of the Venturi tube 13, and is formed between the top opening 132 and the bottom opening 133. The throat 131 is smaller than the top opening 132 in inner diameter, and is smaller than the bottom opening 133 in inner diameter. The Venturi tube 13 has a connecting opening 134 formed through a tube wall of the Venturi tube 13, and the connecting opening 134 corresponds to the throat 131 in position. The connecting opening 134 communicates with the inside of the Venturi tube 13.

Inside the Venturi tube 13, since the throat 131 is smaller than the top opening 132 and the bottom opening 133 in inner diameter, there is an inclined angle θ between an inner wall of the Venturi tube 13 and the central axis of the Venturi tube 13, and the angle θ is preferably from 5 to 7 degrees.

A bottom of the frame 20 is securely connected to the negative pressure mechanism 10.

The float 30 is securely connected to a top of the frame 20, such that the flow-driven assembly 1 is capable of floating in the water. The float 30 has buoyancy, and a magnitude of the buoyancy is controllable. In a preferred embodiment, the float 30 has a container 300, which is hollow and disposed vertically. An outer wall of the container 300 is connected to the frame 20.

The inlet branch tube 12 is equal to the Venturi tube 13 in number. However, in other preferred embodiments, the inlet branch tube 12 may be different from the Venturi tube 13 in number. For example, two inlet branch tubes 12 are connected to one single Venturi tube 13.

Figure 6:
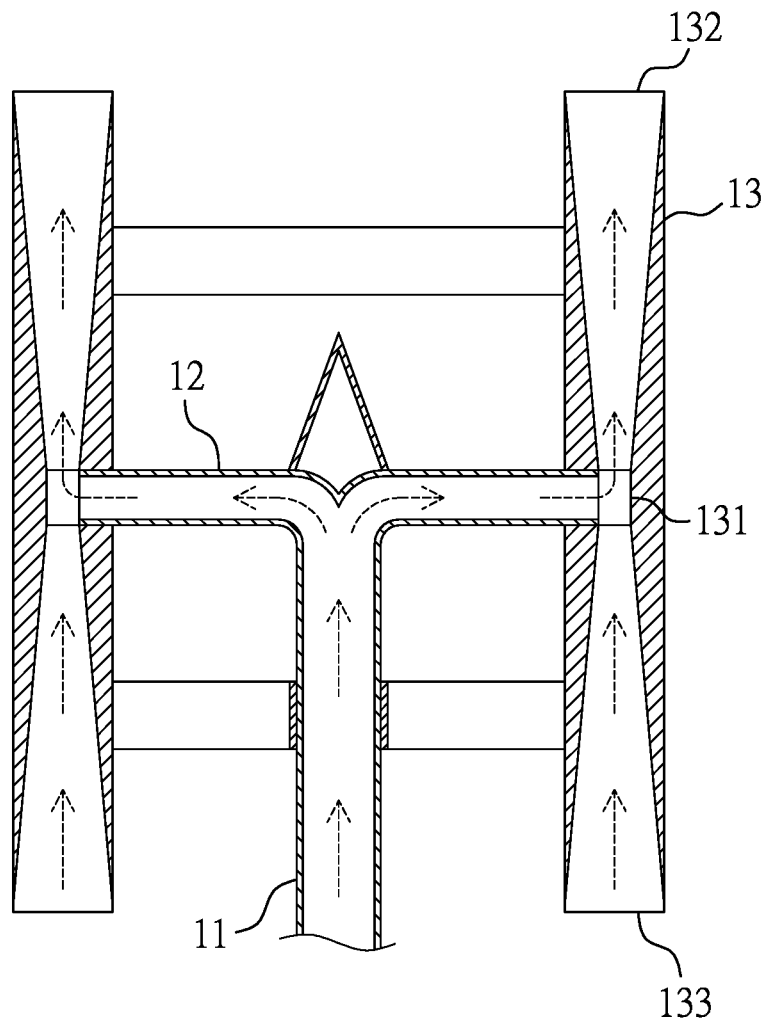
FIG. 6 is an operational front view of the negative pressure mechanism of the flow-driven assembly of the negative-pressure wave generator in FIG. 1, showing the water flow when diving downward.

With reference to FIGS. 5 and 6, the up-and-down movement of the wave moves the negative pressure mechanism 10 under the water up and down as well. At this time, the water flow moves fast in the Venturi tubes 13. Regardless that the water flow moves from the top opening 132 to the bottom opening 133, or from the bottom opening 133 to the top opening 132, the water flow is accelerated due to the variation of the inner diameter when passing through the throat 131. Therefore, a negative press status is formed in the junction between the throat 131 and the end of the inlet branch tube 12, and then a considerable pressure difference between the negative pressure and one atmosphere (1 atm) on the sea is formed. Said pressure difference makes the sea water in the inlet main tube 11 and the inlet branch tubes 12 flow into the Venturi tube 13, and then flow out to the sea from the top opening 132 or the bottom opening 133.

The negative pressure mechanism 10 moves equidistantly along the up-and-down movement of the wave, such that the negative pressure mechanism 10 can form negative pressure regardless that the float 30 is moved upward or downward.

In addition, the higher up-and-down movement frequency the float 30 has, the more intense the negative pressure status is.

With reference to FIGS. 1 to 3, the power-generating assembly 2 has at least one water pipe 40, a power generating culvert 50, a central power station platform 60, and a generator assembly 70. In a preferred embodiment as shown in the figures, the power-generating assembly 2 has multiple water pipes 40.

The water pipe 40 is an elongated tube, and is preferably a soft tube. One of two ends of the water pipe 40 is connected to the other end of the inlet main tube 11. The other end of the water pipe 40 is connected to the power generating culvert 50. Thus, the flow-driven assemblies 1 are connected to the power-generating assembly 2.

Figure 8:
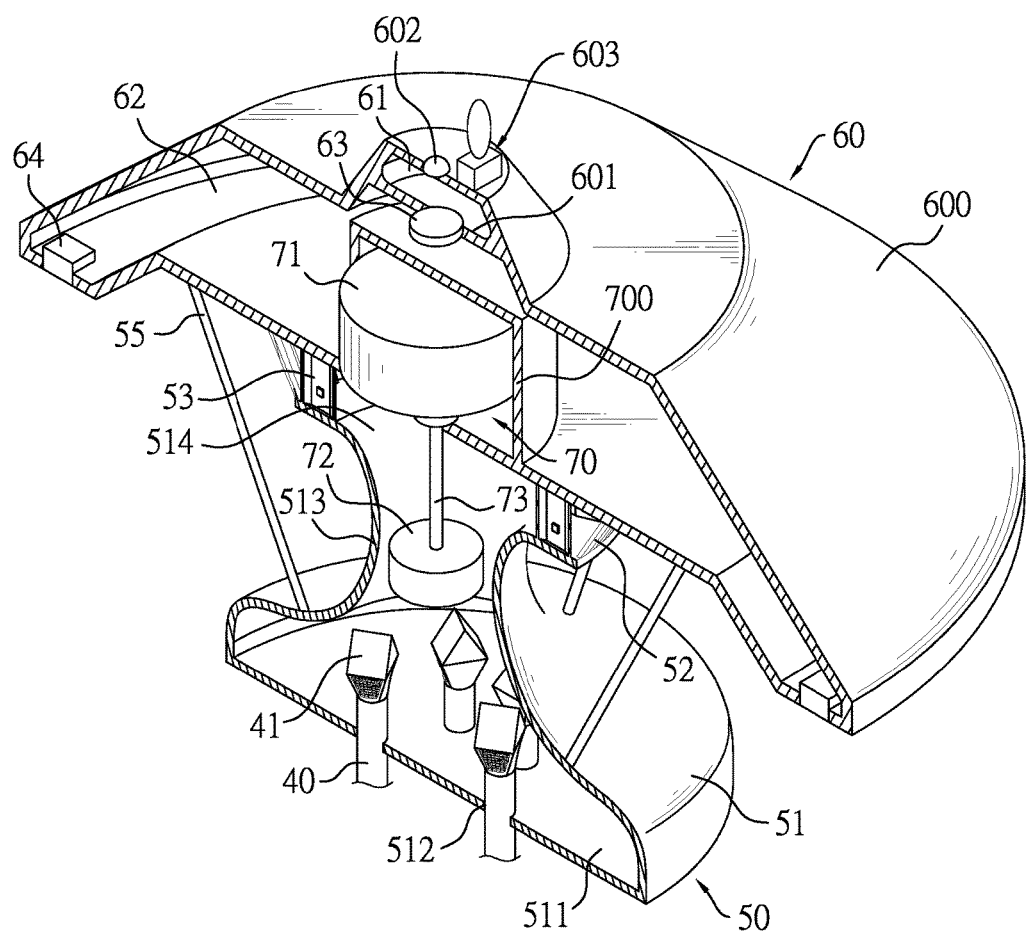
FIG. 8 is a perspective view in partial section of a power-generating assembly of the negative-pressure wave generator in FIG. 1.
Figure 9:
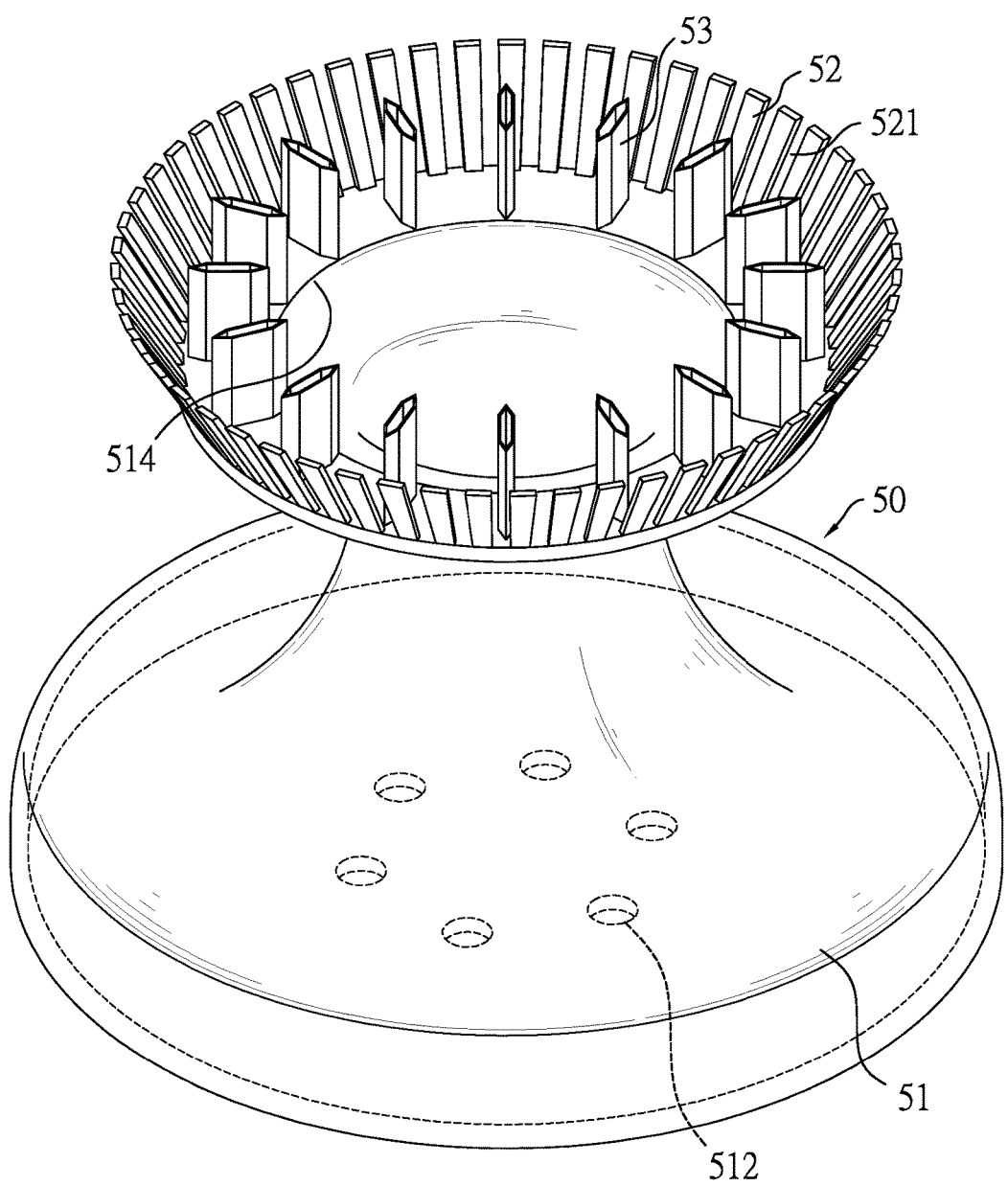
FIG. 9 is a perspective view of a power generating culvert of the negative-pressure wave generator in FIG. 1.

With reference to FIGS. 8 and 9, the power generating culvert 50 is hollow, and is preferably a cylindrical and hollow post as shown in the figures. The power generating culvert 50 has a casing 51, and the casing 51 has a chamber 511, at least one through hole 512, a flow part 513 and an inlet opening 514. The chamber 511 is formed inside of the casing 51. Each through hole 512 is formed through a bottom of the casing 51. The water pipes 40 are respectively mounted through the through holes 512 and an end of the water pipe 40 is disposed in the chamber 511. The flow part 513 is formed in a middle of the casing 51. The inlet opening 514 is disposed above the casing 51 and communicates with the chamber 511. The flow part 513 is disposed between the inlet opening 514 and the end of the water pipes 40. In a preferred embodiment as shown in the figures, the flow part 513 is formed as a tapered neck in the middle of the casing 51.

The central power station platform 60 is hollow, such that the power-generating assembly 2 is capable of floating in the water. The central power station platform 60 has buoyancy, and a magnitude of the buoyancy is controllable. A bottom of the central power station platform 60 is connected to the power generating culvert 50. The inlet opening 514 of the power generating culvert 50 communicates to the sea, and thus sea water flows into the chamber 511 from the inlet opening 514.

With reference to FIG. 2, the generator assembly 70 has a generator 71, a turbine 72, and a driven shaft 73. The driven shaft 73 is connected between the generator 71 and the turbine 72 to make the turbine 72 drive the generator 71. An accelerator 75 may be mounted on the driven shaft 73 to accelerate the rotation from the turbine 72 to the generator 71. This part of the generator assembly 70 is a conventional technique, and detail thereof is omitted.

The generator 71 of the generator assembly 70 is mounted on the central power station platform 60. A surrounder 700 is mounted in a casing 600 of the central power station platform 60, and has an inner space for the generator 71 to be installed. A bearing 74 is mounted on a bottom of the casing 600, and is water-sealed. The driven shaft 73 is mounted through the bearing 74. The turbine 72 is mounted in the flow part 513 of the power generating culvert 50. Thus, sea water flows into the chamber 511 from the inlet opening 514 and the flow part 513, and then flows into the water pipes 40. When the sea water passes through the turbine 72 in the flow part 513, the water flow drives and rotates the turbine 72, thereby making the generator assembly 70 generate power.

When the negative-pressure wave generator as described is in use, the flow-driven assembly 1 is disposed in the sea, and the negative pressure mechanism 10 is moved along with the up-and-down movement of the wave. Therefore, a negative press status is formed in the throat 131 of the Venturi tube 13. At this time, sea water in the water pipes 40, the inlet main tube 11, and the inlet branch tubes 12 flows fast into the Venturi tube 13 unidirectionally, and then flows out to the sea from the top opening 132 or the bottom opening 133. Since the chamber 511 of the power generating culvert 50 is connected to the water pipes 40, the water in the chamber 511 flows into the water pipes 40, and then the sea water flows into the chamber 511 from the inlet opening 514, thereby rotating the turbine 72 to make the generator assembly 70 generate power. As a result, both the upward movement and the downward movement of the wave can form negative pressure, and thus the power generation can proceed continuously.

The negative pressure mechanism 10 further has multiple connecting rods 14. Two ends of each connecting rod 14 are securely connected between two adjacent Venturi tubes 13 respectively, or two ends of each connecting rod 14 are securely connected between one Venturi tube 13 and the inlet main tube 11 respectively. In a preferred embodiment as shown in FIGS. 3 and 4, the negative pressure mechanism 10 has six Venturi tubes 13. Each two adjacent Venturi tubes 13 have a respective pair of the connecting rods 14 mounted therebetween. Said pair of the connecting rods 14 are spaced apart from each other. There is one connecting rod 14 mounted between one of the Venturi tubes 13 and the inlet main tube 11. The inlet main tube 11 is disposed in a center between the six Venturi tubes 13, and the six Venturi tubes 13 form a hexagon.

The negative pressure mechanism 10 further has a guiding cover 15. The guiding cover 15 is conical, and is mounted above a junction between the inlet main tube 11 and the inlet branch tubes 12.

In a preferred embodiment, the frame 20 has multiple stabilizing panels 21, multiple main rods 22, and multiple side rods 23. The main rods 22 are disposed vertically, and are connected to the Venturi tubes 13. Each side rod 23 is mounted between two adjacent main rods 22. The stabilizing panels 21 are mounted on outer walls of the main rods 22. In a preferred embodiment as shown in FIGS. 3 and 4, between two vertical main rods 22, there are two side rods 23 disposed transversely and spaced vertically apart from each other and another two side rods 23 intersecting each other.

With reference to FIGS. 2 and 3, the float 30 further has a partition panel 301 mounted inside of the container 300 and separating an inner space of the container 300 into a first inner space 31 and a second inner space 32. The first inner space 31 may be disposed above the second inner space 32 as shown in the figures. The float 30 further has an air compressor 33 mounted on the partition panel 301 and the air compressor 33 is capable of functioning as a gas valve. The air compressor 33 is a conventional technique, and detail thereof is omitted. Two openings of the air compressor 33 respectively communicate with the first inner space 31 and the second inner space 32. The air compressor 33 can pressurize and transport the air in the second inner space 32 to the first inner space 31, or can depressurize and transport the air in the first inner space 31 to the second inner space 32.

The float 30 has at least one pumping drainage machine 34 disposed below the container 300. The pumping drainage machine 34 is capable of functioning as a water valve. The pumping drainage machine 34 is a conventional technique, and detail thereof is omitted. A tube 341 is mounted on one of two end openings of the pumping drainage machine 34, and the other end opening of the pumping drainage machine 34 communicates with the second inner space 32. The pumping drainage machine 34 can transport the sea water into the second inner space 32, or can transport the sea water out of the second inner space 32 to the sea.

In a preferred embodiment as shown in FIG. 8, the central power station platform 60 is a circular and hollow plate. The central power station platform 60 has a casing 600 and a partition panel 601. The partition panel 601 is mounted inside of the casing 600 and separating an inner space of the casing 600 into a third inner space 61 and a fourth inner space 62. The third inner space 61 may be disposed above the fourth inner space 62 as shown in the figures. The central power station platform 60 has an air compressor 63 mounted on the partition panel 601 and the air compressor 63 is capable of functioning as a gas valve. The air compressor 63 is a conventional technique, and detail thereof is omitted. Two openings of the air compressor 63 respectively communicate with the third inner space 61 and the fourth inner space 62. The air compressor 63 can pressurize and transport the air in the fourth inner space 62 to the third inner space 61, or can depressurize and transport the air in the third inner space 61 to the fourth inner space 62.

The central power station platform 60 has at least one pumping drainage machine 64 disposed below the casing 600. The pumping drainage machine 64 is capable of functioning as a water valve. The pumping drainage machine 64 is a conventional technique, and detail thereof is omitted. One of two end openings of the pumping drainage machine 64 communicates with the fourth inner space 62. The pumping drainage machine 64 can transport the sea water into the fourth inner space 62, or can transport the sea water out of the fourth inner space 62 to the sea.

Figure 16:
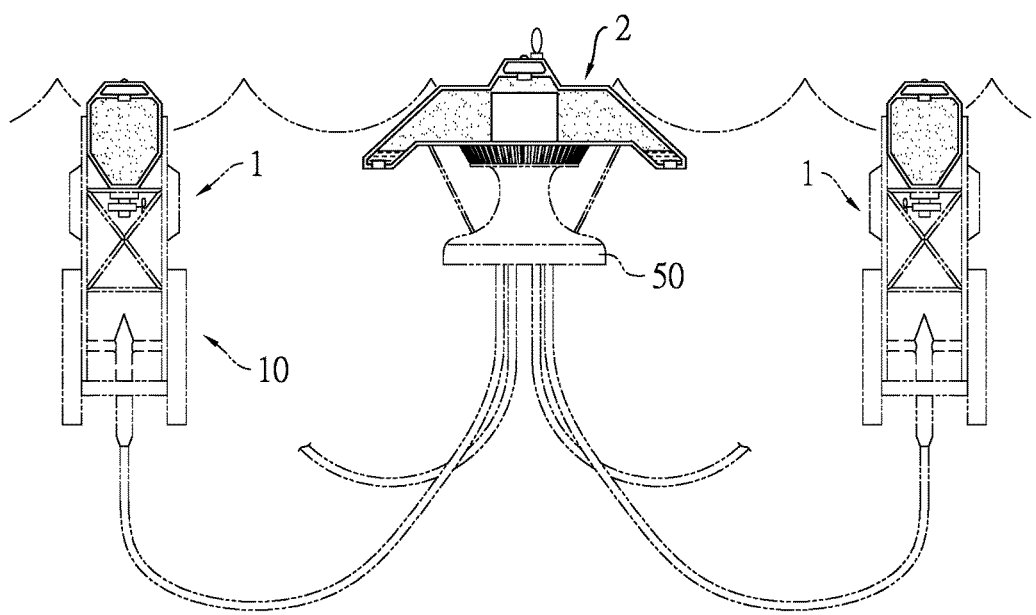
FIG. 16 is a front view of the negative-pressure wave generator in FIG. 1, shown floating in the water.

With reference to FIG. 16, when the negative-pressure wave generator is used in a normal weather condition, the float 30 of the flow-driven assembly 1 and the central power station platform 60 of the power-generating assembly 2 float on the sea, and the negative-pressure wave generator generates power by the wave.

Figure 15:
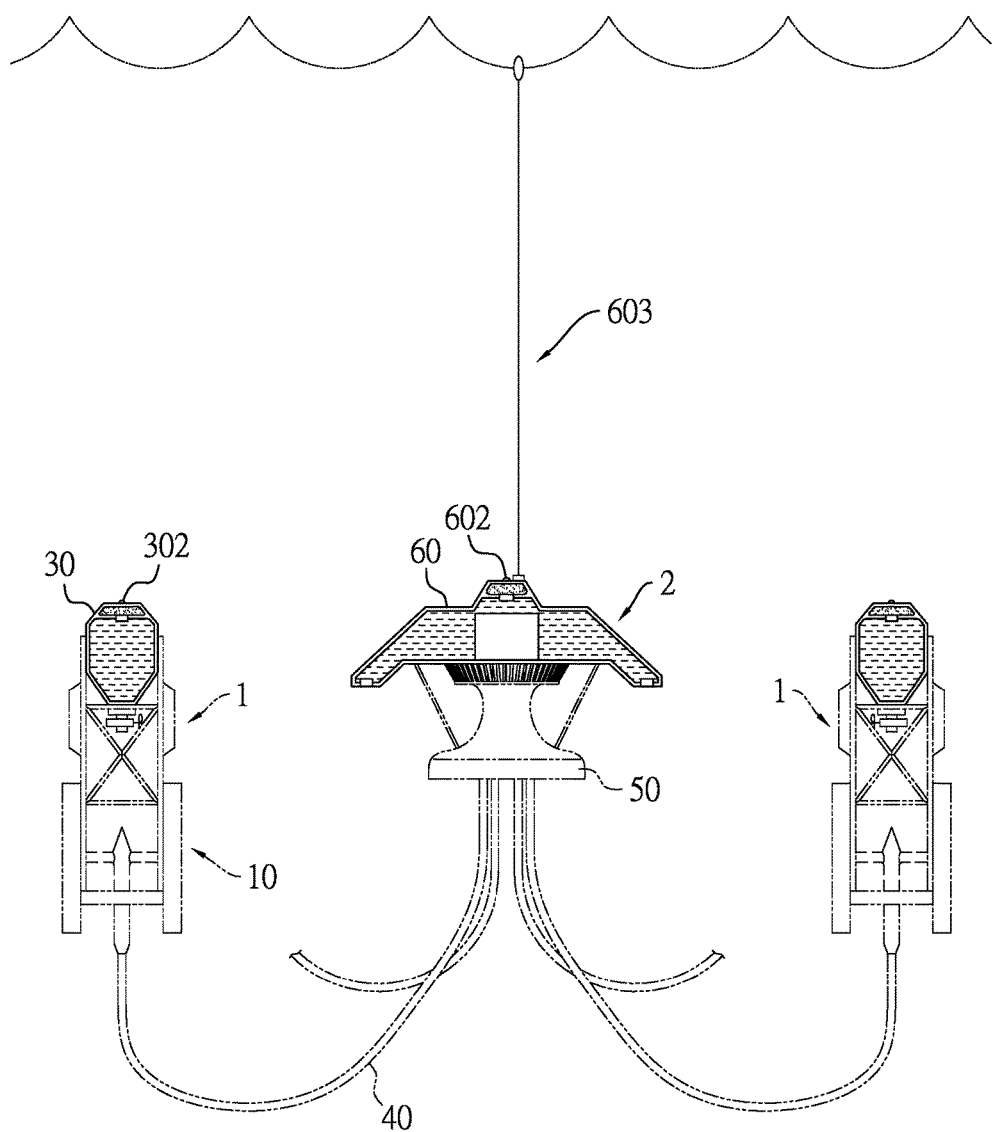
FIG. 15 is a front view of the negative-pressure wave generator in FIG. 1, shown diving in the water.

With reference to FIG. 15, when the negative-pressure wave generator is used in a severe weather condition, the air compressor 33 in the float 30 is actuated to store the air of the second inner space 32 in the smaller-volume first inner space 31, and the air compressor 63 in the central power station platform 60 is actuated to store the air of the fourth inner space 62 in the smaller-volume third inner space 61. In addition, the pumping drainage machine 34 pumps the sea water into the second inner space 32, and the pumping drainage machine 64 pumps the sea water into the fourth inner space 62. The buoyancies generated by the float 30 and the central power station platform 60 are decreased, such that the negative-pressure wave generator dives into the sea for a distance about 40 to 60 meters by its weight, thereby preventing the negative-pressure wave generator from damage from the bad weather condition. To be specific, the negative-pressure wave generator can be installed with a gyroscope and sonar detecting system. The computer can calculate the diving distance and the amount of the discharged water to keep the negative-pressure wave generator stay in said diving distance. The aforementioned devices are conventional techniques, and details thereof are omitted.

When the weather condition returns to the normal condition, the pumping drainage machine 34 is actuated to discharge the water in the second inner space 32 to the sea, and the air compressor 33 is actuated to transport the air in the first inner space 31 back to the second inner space 32. At this time, the buoyancy generated by the second inner space 32 makes the flow-driven assembly 1 float upward. In addition, the pumping drainage machine 64 is actuated to discharge the water in the fourth inner space 62 to the sea, and the air compressor 63 is actuated to transport the air in the third inner space 61 back to the fourth inner space 62. At this time, the buoyancy generated by the hollow casing 600 of the central power station platform 60 makes the power-generating assembly 2 float upward as shown in FIG. 16.

With reference to FIGS. 8 and 9, the power generating culvert 50 further has a fence 52 mounted on and surrounding the inlet opening 514 of the casing 51. The fence 52 is mounted between the casing 51 and a bottom of the casing 600 of the central power station platform 60, and the fence 52 has multiple flow holes 521, thereby preventing huge objects and marine creatures from entering the inlet opening 514, while the sea water still can enter the inlet opening 514 from the flow holes 521. Since the negative-pressure wave generator is moved up and down as the wave, the negative-pressure wave generator does not affect the marine creatures.

Figure 10:
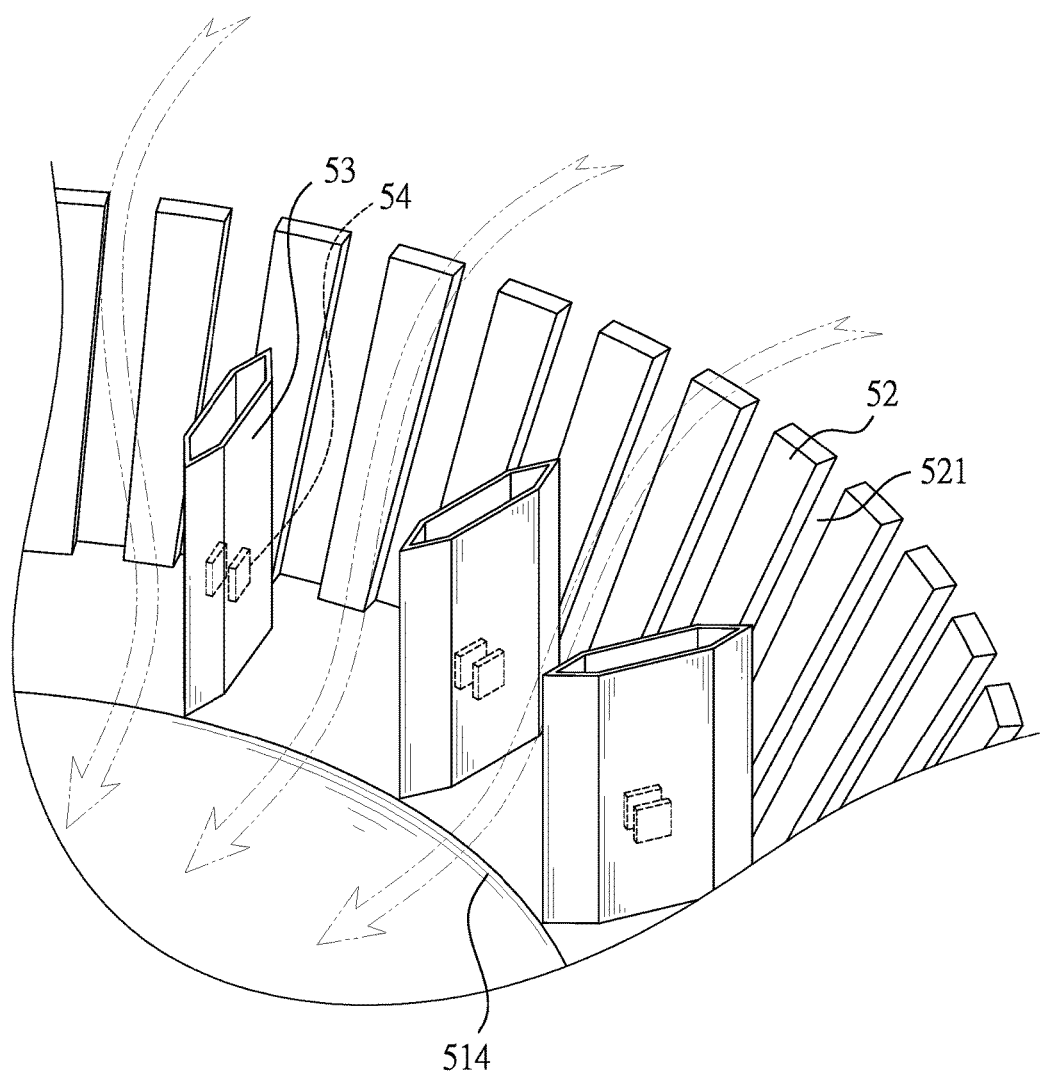
FIG. 10 is a perspective view of the negative-pressure wave generator in FIG. 1, showing water flowing into the power generating culvert.
Figure 11:
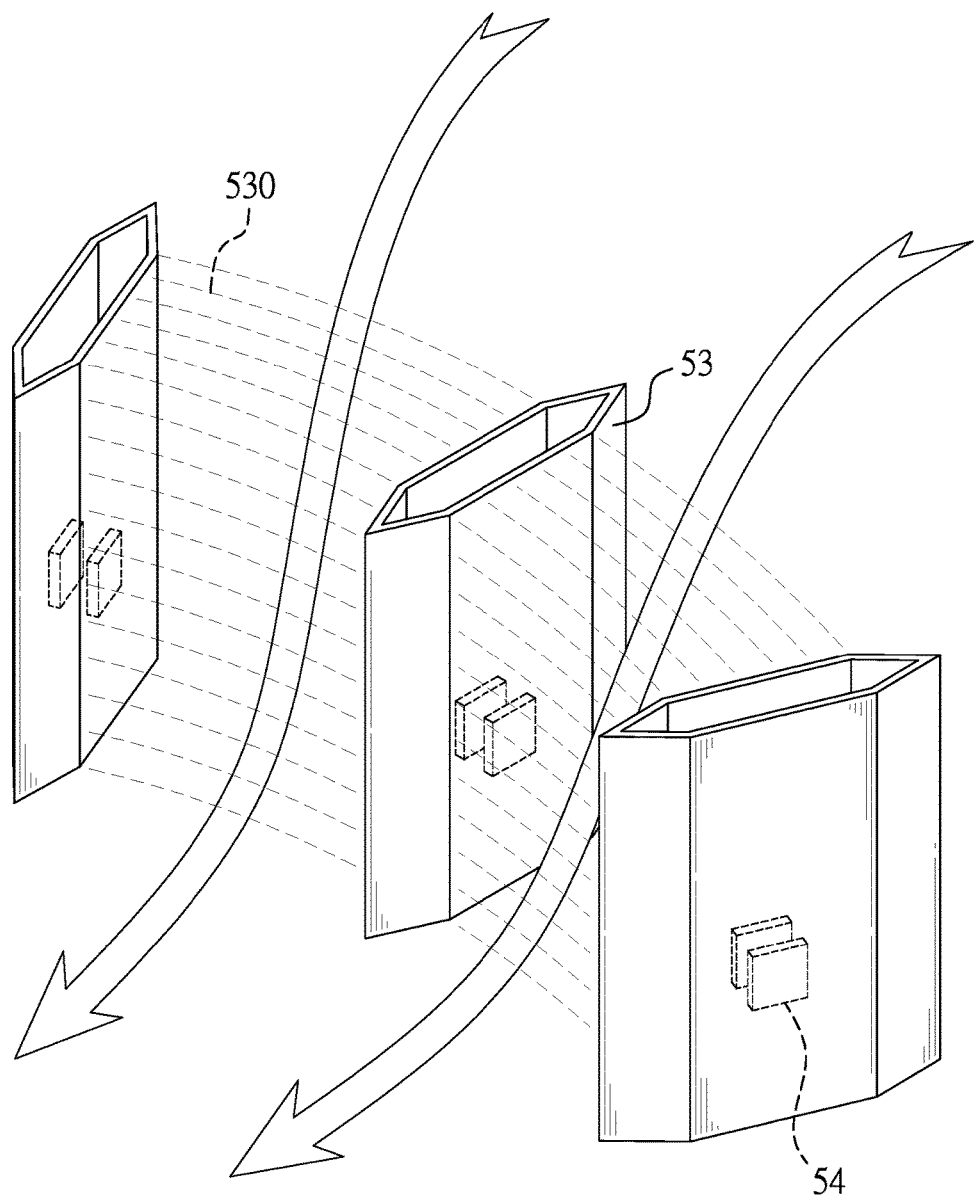
FIG. 11 is a perspective view of the negative-pressure wave generator in FIG. 1, showing an ultrasound irradiation area in the power generating culvert.

With reference to FIGS. 10 and 11, the power generating culvert 50 further has multiple guiding plates 53 mounted on the inlet opening 514 of the casing 51. The guiding plates 53 are arranged apart from each other, and are disposed at an inner side of the fence 52. The power generating culvert 50 further has multiple ultrasound assemblies 54. Each two adjacent guiding plates 53 have a respective one of the ultrasound assemblies 54 mounted therebetween, thereby forming an ultrasound irradiation area 530 between said two adjacent guiding plates 53. Marine creatures and spores, which flow through the flow holes 521 and pass through the ultrasound irradiation area 530, are affected physiologically by the ultrasound shock wave. Therefore, the marine creatures and the spores cannot attach to an inner wall of the flow channels and flow out along with the water flow. The ultrasound assembly 54 is a conventional technique, and detail thereof is omitted.

With reference to FIG. 8, the power generating culvert 50 further has multiple branch rods 55 connected between the casing 51 of the power generating culvert 50 and the bottom of the casing 600 of the central power station platform 60. The branch rods 55 can strengthen the structure of the power-generating assembly 2.

Figure 12:
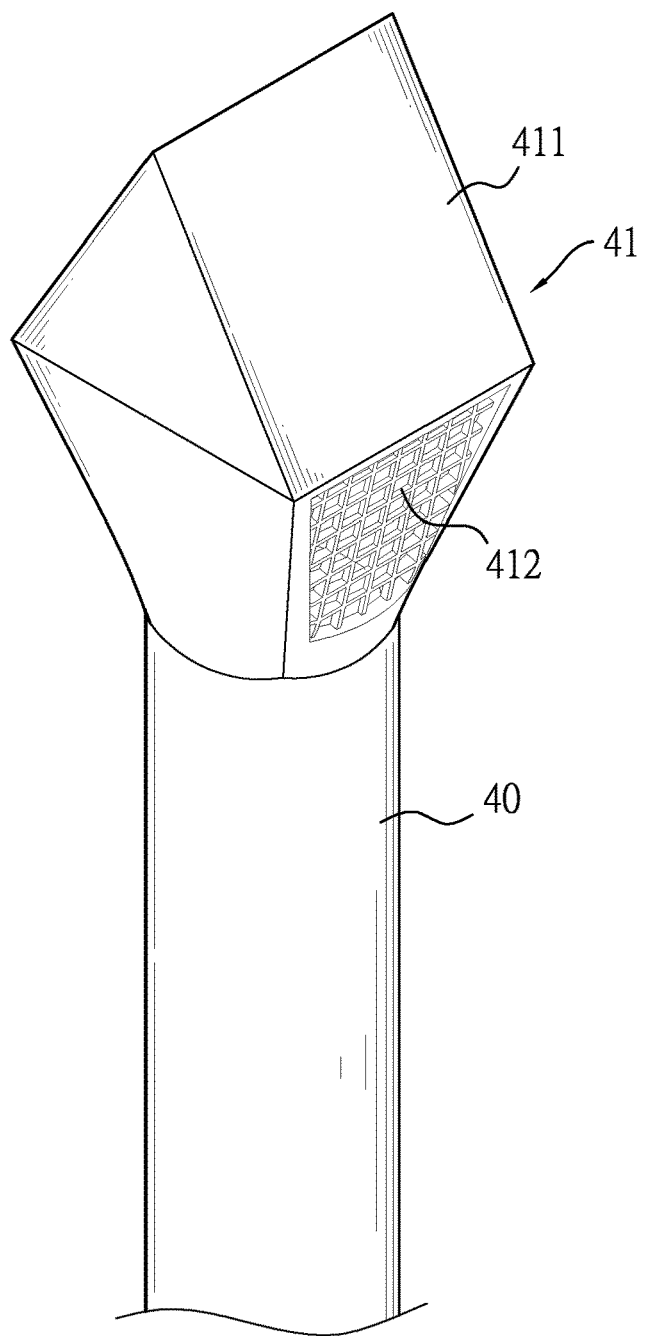
FIG. 12 is a perspective view of a backflow barrier of the negative-pressure wave generator in FIG. 1.
Figure 13:
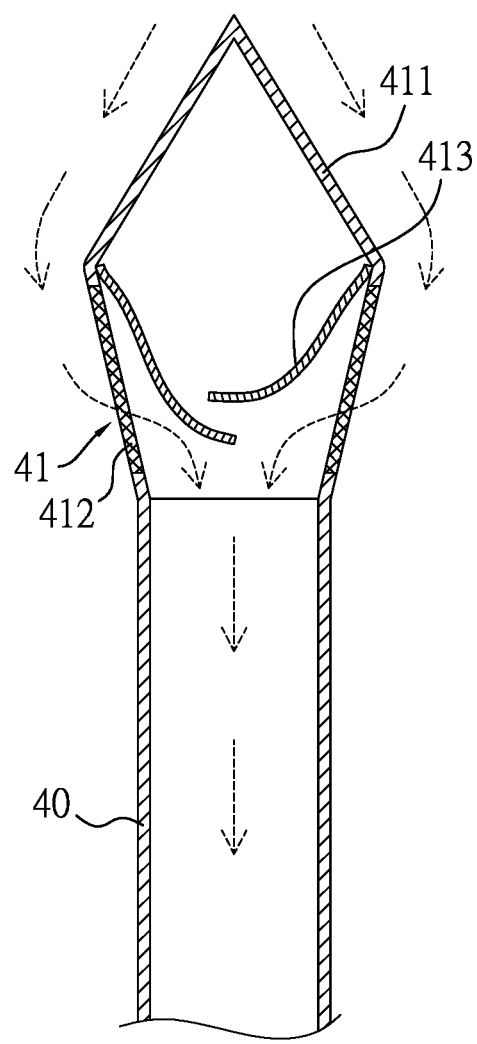
FIG. 13 is a front view of the negative-pressure wave generator in FIG. 1, showing water flow between a water pipe and the backflow barrier.
Figure 14:
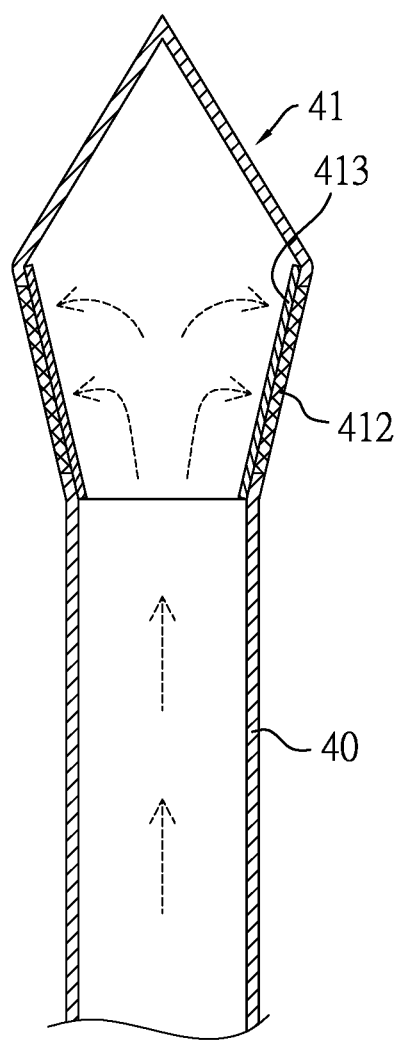
FIG. 14 is another front view of the negative-pressure wave generator in FIG. 1, showing water flow between the water pipe and the backflow barrier.

With reference to FIGS. 12 and 13, the negative-pressure wave generator further has multiple backflow barriers 41 respectively mounted on the ends of the water pipes 40. The backflow barrier 41 is disposed in the chamber 511 of the power generating culvert 50. In one of the preferred embodiments, the backflow barrier 41 has a main body 411. The main body 411 is hollow and has an inner space and multiple side walls. Some of the side walls have multiple meshes 412 formed therethrough, and each one of said side walls has a backflow barrier plate 413. One side of the backflow barrier plate 413 is connected to the inner wall of the main body 411, and the backflow barrier plate 413 is capable of being attached to and sealing the meshes 412. When the sea water in the chamber 511 flows into the main body 411 from the meshes 412, the water flow can push away the backflow barrier plate 413. When the water in the main body 411 flows into the chamber 511, the water is blocked by the backflow barrier plate 413 as shown in FIG. 14, thereby keeping the water flowing unidirectionally. Furthermore, the backflow barrier 41 has the function of a valve, such that the backflow barrier 41 can automatically seal the water pipe 40 by the pressure variation in the flow channels when any water pipe 40 or the negative pressure mechanism 10 has leakage. Therefore, the backflow barrier 41 can keep the negative-pressure wave generator working normally.

With reference to FIGS. 2 and 8, the float 30 has a global positioning system (GPS) 302 mounted on a top of the container 300. The central power station platform 60 has a global positioning system 602 and an antenna assembly 603 both mounted on the casing 600. The two global positioning systems 302, 602 and the antenna assembly 603 are conventional techniques, and details thereof are omitted. The two global positioning systems 302, 602 and the antenna assembly 603 enable the user to control and observe the position of the negative-pressure wave generator remotely.

With reference to FIG. 15, the antenna assembly 603 has a cable and a float unit. One end of the cable is connected to the float unit, and the float unit has an antenna receiving end. The other end of the cable is connected to a winch. Theses parts of the structure are conventional techniques, and details thereof are omitted. When the power generating assembly 2 and the central power station platform 60 dive into the sea, the winch releases the cable and the float unit moves the antenna receiving end upward to the water surface. When the power-generating assembly 2 and the central power station platform 60 float upward, the winch recoils the cable. At this time, the antenna receiving end of the antenna assembly is disposed on the casing 600 of the central power station platform 60. Therefore, the negative-pressure wave generator can keep in connection with the remote signal, and thus can be remotely controlled.

The float 30 further has a propeller 35 mounted on the tube 341. The propeller 35 is connected to the central power station platform 60 via a cable. The propeller 35 is controlled by a control mechanism, such that the propeller 35 is rotatable relative to the tube 341 of the float 30 to adjust and control the propelling direction of the propeller 35. The aforementioned control mechanism can be wirelessly controlled remotely. The propeller 35 is a conventional technique, and detail thereof is omitted. When the global positioning system 302 of the flow-driven assembly 1 detects that its position is away from a predetermined position, the propeller 35 can be actuated by remote control to move the flow-driven assembly 1 to the predetermined position. In addition, the distance between the flow-driven assemblies 1 or the distance between flow-driven assembly 1 and the power-generating assembly 2 also can be controlled by the global positioning system 302 and the propeller 35 to prevent the flow-driven assembly 1 and the power-generating assembly 2 from disturbing each other.

All the control devices and equipments can be powered by the generator 71. In addition, the power transmission to the float 30 of the flow-driven assembly 1 and the signal transmission to the central power station platform 60 can be achieved via cables.

The amount of the negative pressure mechanism 10 of the flow-driven assembly 1 can be increased depending on demand and is not limited. When the flow-driven assembly 1 has more negative pressure mechanisms 10, the more unidirectional water flow passes through the power generating culvert 50. At this time, the pulsation is less and the water flow is more stable. Besides, the unidirectional water flow passing through the power generating culvert 50 is pushed by the pressure difference between the negative pressure generated in the negative pressure mechanism 10 and one atmosphere (1 atm) on the sea. Thus, the middle-level wave, which has short period, high frequency, and wave height in two to three meters, is suitable for the present invention to generate power. As a result, the present invention is applicable in many sea areas.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A negative-pressure wave generator comprising:
   multiple flow-driven assemblies, each one of the multiple flow-driven assemblies having
      a negative pressure mechanism having
         an inlet main tube;
         multiple Venturi tubes disposed vertically, each one of the multiple Venturi tubes being a hollow tube, and having
            a top opening disposed in a top end of the Venturi tube;
            a bottom opening disposed in a bottom end of the Venturi tube; and
            a throat formed between the top opening and the bottom opening, and being smaller than the top opening and the bottom opening in inner diameter;
         multiple inlet branch tubes connected between and communicating with the inlet main tube and the throat of the multiple Venturi tubes; each one of the multiple inlet branch tubes being oval in cross section; and
         multiple connecting rods, each one of the connecting rods connected between two adjacent ones of the multiple Venturi tubes;
      a float having buoyancy and capable of controlling a magnitude of the buoyancy; and
      a frame connected between the negative pressure mechanism and the float, and connected to the multiple Venturi tubes of the negative pressure mechanism; and
   a power-generating assembly having
      multiple water pipes connected to the inlet main tube;
      a power generating culvert having a casing, and the casing having
         a chamber formed inside of the casing;
         multiple through holes formed through a bottom of the casing; an end of the multiple water pipes mounted through the multiple through holes and disposed in the chamber;
         an inlet opening disposed above the casing and communicating with the chamber; and
         a flow part formed in a middle of the casing, and disposed between the inlet opening and the end of the multiple water pipes;
      a central power station platform connected to the power generating culvert, and having buoyancy and capable of controlling a magnitude of the buoyancy; and
      a generator assembly having
         a generator mounted on the central power station platform;
         a turbine disposed in the flow part of the power generating culvert; and
         a driven shaft connected between the generator and the turbine to make the turbine drive the generator.

2. The negative-pressure wave generator as claimed in claim 1 further comprising
   multiple backflow barriers respectively mounted on the end of the multiple water pipes, selectively closing an opening of the end, disposed in the chamber, and each one of the multiple backflow barriers having
a main body having
an inner space;
a side wall; and
multiple meshes formed on the side wall; and
a backflow barrier plate selectively attached to and sealing the meshes.

3. The negative-pressure wave generator as claimed in claim 1, wherein the power generating culvert has
a fence mounted between the inlet opening of the casing of the power generating culvert and a bottom of the central power station platform, and having multiple flow holes;
multiple guiding plates mounted between the inlet opening of the casing of the power generating culvert and the bottom of the central power station platform, arranged apart from each other, and disposed at an inner side of the fence;
multiple ultrasound assemblies, and each two adjacent guiding plates having a respective one of the ultrasound assemblies mounted therebetween; and
multiple ultrasound irradiation areas, and each two adjacent guiding plates having a respective one of the ultrasound irradiation areas formed therebetween.

4. The negative-pressure wave generator as claimed in claim 2, wherein the power generating culvert has
a fence mounted between the inlet opening of the casing of the power generating culvert and a bottom of the central power station platform, and having multiple flow holes;
multiple guiding plates mounted between the inlet opening of the casing of the power generating culvert and the bottom of the central power station platform, arranged apart from each other, and disposed at an inner side of the fence;
multiple ultrasound assemblies, and each two adjacent guiding plates having a respective one of the ultrasound assemblies mounted therebetween; and
multiple ultrasound irradiation areas, and each two adjacent guiding plates having a respective one of the ultrasound irradiation areas formed therebetween.

5. The negative-pressure wave generator as claimed in claim 1, wherein
the float has
a container connected to the frame;
a partition panel mounted inside of the container and dividing an inner space of the container into a first inner space and a second inner space;
an air compressor mounted on the partition panel and capable of functioning as a gas valve;
at least one pumping drainage machine disposed below the container, and capable of functioning as a water valve; one of two end openings of the at least one pumping drainage machine communicating with the second inner space; and
a tube mounted on the other end opening of the pumping drainage machine; and
the central power station platform has
a casing;
a partition panel mounted inside of the casing of the central power station platform and dividing an inner space of the casing of the central power station platform into a third inner space and a fourth inner space;
an air compressor mounted on the partition panel and capable of functioning as a gas valve; and
at least one pumping drainage machine disposed below the casing of the central power station platform, and capable of functioning as a water valve; one of two end openings of the at least one pumping drainage machine of the central power station platform communicating with the fourth inner space.

6. The negative-pressure wave generator as claimed in claim 4, wherein
the float has
a container connected to the frame;
a partition panel mounted inside of the container and dividing an inner space of the container into a first inner space and a second inner space;
an air compressor mounted on the partition panel and capable of functioning as a gas valve;
at least one pumping drainage machine disposed below the container, and capable of functioning as a water valve; one of two end openings of the at least one pumping drainage machine communicating with the second inner space; and
a tube mounted on the other end opening of the pumping drainage machine; and
the central power station platform has
a casing;
a partition panel mounted inside of the casing of the central power station platform and separating an inner space of the casing of the central power station platform into a third inner space and a fourth inner space;
an air compressor mounted on the partition panel and capable of functioning as a gas valve; and
at least one pumping drainage machine disposed below the casing of the central power station platform, and capable of functioning as a water valve; one of two end openings of the at least one pumping drainage machine of the central power station platform communicating with the fourth inner space.

7. The negative-pressure wave generator as claimed in claim 5, wherein the float has
a propeller mounted on the tube of the float, connected to the central power station platform via a cable, and being rotatable relative to the tube of the float to adjust and control the propelling direction of the propeller.

8. The negative-pressure wave generator as claimed in claim 6, wherein the float has
a propeller mounted on the tube of the float, connected to the central power station platform via a cable, and being rotatable relative to the tube of the float to adjust and control the propelling direction of the propeller.

9. The negative-pressure wave generator as claimed in claim 7, wherein in the float, the propeller is controlled and driven by wireless remote control.

10. The negative-pressure wave generator as claimed in claim 8, wherein in the float, the propeller is controlled and driven by wireless remote control.

11. The negative-pressure wave generator as claimed in claim 7, wherein
the float has
a global positioning system mounted on a top of the container; and the central power station platform has
a global positioning system mounted on the casing of the central power station platform; and
an antenna assembly mounted on the casing of the central power station platform, and having
a float unit having an antenna receiving end;
a winch; and a cable connected between the float unit and the winch.

12. The negative-pressure wave generator as claimed in claim 10, wherein the float has
   a global positioning system mounted on a top of the container; and the central power station platform has
   a global positioning system mounted on the casing of the central power station platform; and
   an antenna assembly mounted on the casing of the central power station platform, and having
      a float unit having an antenna receiving end;
      a winch; and
      a cable connected between the float unit and the winch.

13. The negative-pressure wave generator as claimed in claim 1, wherein the frame has
   multiple main rods disposed vertically and connected to the Venturi tubes;
   multiple side rods mounted between two adjacent ones of the multiple main rods; and
   multiple stabilizing panels mounted on outer walls of the main rods.

14. The negative-pressure wave generator as claimed in claim 12, wherein the frame has
   multiple main rods disposed vertically and connected to the Venturi tubes;
   multiple side rods mounted between two adjacent ones of the multiple main rods; and
   multiple stabilizing panels mounted on outer walls of the main rods.

* * * * *